United States Patent Office 3,661,967
Patented May 9, 1972

---

3,661,967
CYANO CONTAINING POLYFLUOROAROMATIC COMPOUNDS
Richard W. Anderson, Midland County, and Hughie R. Frick, Bay County, Mich., assignors to The Dow Chemical Company, Midland, Mich.
No Drawing. Filed Sept. 25, 1968, Ser. No. 762,628
Int. Cl. C07c *121/52, 121/54*
U.S. Cl. 260—465 F                        2 Claims

ABSTRACT OF THE DISCLOSURE

Compounds of the following type are provided:

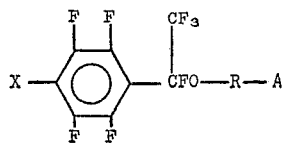

wherein A is a halogen or

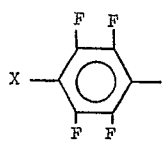

wherein R is a saturated, accyclic, perhalo, organic group consisting essentially of carbon, fluorine and optionally oxygen; and wherein X is an electron withdrawing substituent other than halogen or a group which readily undergoes nucleophilic attack. Also provided is a process for the preparation of these compounds, which comprises the reaction of

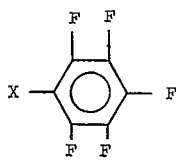

wherein X is as defined above, with a vinyl ether, in the presence of an alkali metal fluoride.

---

The invention herein described was made in the course of, or under a contract or subcontract thereunder, with the Department of the Air Force.

This invention relates to novel derivatives of polyfluoroaromatic compounds and to a method for the preparation of such derivatives. One embodiment of the present invention particularly relates to a novel method of attaching long aliphatic side chain to fluorinated aromatic molecules.

Alkali metal fluoride catalyzed perfluoro-alkylation of fluorinated aromatic molecules is known. Dressler and Young, Jr. Org. Chem., 32, 2004 (1967), report that the reaction of cyanuric fluoride and perfluoropropylene proceeds smoothly, in the presence of an alkali metal fluoride, to yield perfluoroisopropyl s-triazines. However, this reaction has the inherent limitation that longer chain perfluoro-α-olefins (e.g., $CF_2=CCF—C_5F_{11}$) cannot be utilized. In the presence of the required alkali metal fluoride catalyst, perfluorinated 1-alkenes isomerize the carbon-carbon double bond to an internal position, which is much less reactive. Unexpectedly, it has been found that the problem of isomerization can be eliminated by the use of vinyl ethers in place of the 1-alkenes previously used to alkylate fluorinated aromatic molecules.

It is a principal object of this invention to provide simple compounds and polymers which exhibit chemical and thermal stability.

It is another object of the present invention to provide novel derivatives of polyfluoroaromaticc compounds.

It is still another object of the present invention to provide novel perhaloalkoxy polyfluoroaromaticc compounds.

It is a further object of this invention to provide novel perhalopolyalkylene glycol bis(4-(electron withdrawing group)-α,2,3,5,6 - pentafluoro-α-(trifluoromethyl)benzyl) ether compounds.

It is yet another object of this invention to provide novel bis (4-(electron withdrawing group)-α,2,3,5,6-pentafluoro-α - (trifluoromethyl)benzyloxy)perfluoroalkane compounds.

It is also an object of this invention to provide a process for the production of said compounds.

These and other objects and advantages will become apparent from the detailed description presented herinafter.

The present invention comprises novel compounds of the following type:

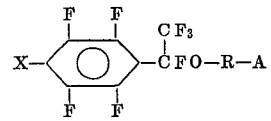

wherein A is a halogen or:

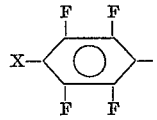

wherein R is a saturated, acyclic, perhalo, organic group comprising essentially carbon, fluorine and optionally oxygen; and wherein X is an electron withdrawing group (see, Organic Chemistry, Morrison and Boyd, 1st edition, page 403) other than halogen or groups which readily undergo nucleophilic attack, such as aldehydes and ketones.

The present invention more particularly comprises novel compounds of the following type:

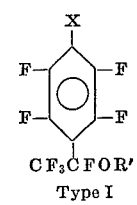

Type I and

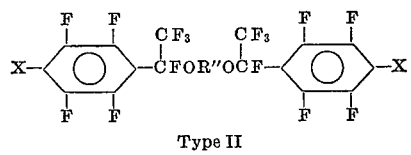

Type II wherein R' is selected from the group consistong of normal and branched chain perhaloalkyl and perhaloalkoxyalkyl groups; wherein R" is selected from the group consisting of perhalomethylene, perhalopolymethylene, perhalopolymethylene ethers, normal and branched chain perhaloalkyl substituted perhalomethylene, normal and branched chain perhaloalkyl substituted perhalopolymethylene and normal and branched chain perhaloalkyl substituted perhalopolymethylene ethers, and wherein X is an electron withdrawing substituent other than halogen or a group which readily undergoes nucleophilic attack. X may be, for example, a nitro, nitrile, sulfone, carboxylate, perhaloalkyl, or an ester group.

Also provided by the present invention is a process for the preparation of said compounds, which comprises the reaction of

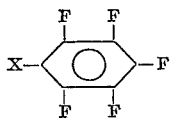

wherein X is as defined above, with a vinyl ether, in the presence of an alkali metal fluoride. More particularly, the preparation of compounds of Type I comprises the reaction of

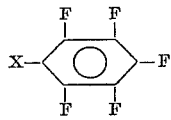

wherein X is as hereinbefore defined, with $CF_2=CFOR'$ wherein R' is as hereinbefore defined, in the presence of an alkali metal fluoride. Compounds of Type II are prepared by the reaction of

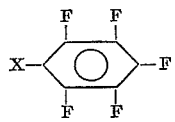

wherein X is as hereinbefore described, with

$$CF_2=CFOR''OCF=CF_2$$

wherein R'' is as hereinbefore defined, in the presence of an alkali metal fluoride.

Compounds of the present invention are particularly useful as chemically and thermally stable fluids. For example, they are useful as hydraulic and dielectric fluids. The compounds of the present invention are also useful as intermediates in the synthesis of oil additives, monomers, and other fluids. For examples of applications of fluorocarbons, see Bennet et al. (U.S. 3,300,537), Teumac et al. (U.S. 3,253,046), Markarian (U.S. 2,680,770) and Noller, Textbook of Organic Chemistry, 2d edition, page 523. The compounds of the present invention which do not contain chlorine and hydrogen are of particular interest in that they have superior thermal stability and excellent oxidation resistance.

Preferred embodiments of the compounds of the present invention are compounds having the following structures:

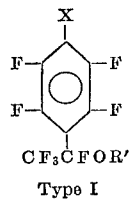

Type I and

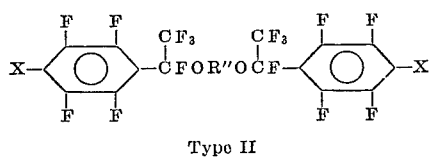

Type II wherein R' is selected from the group consisting of normal and branched chain perhaloalkyl groups containing from about 1 to about 20 carbon atoms and normal and branched chain perhaloalkoxyalkyl groups containing from about 3 to about 20 skeletal atoms, i.e., C and O; wherein R'' is selected from the group consisting of perhalomethylene, perhalopolymethylene containing from about 2 to about 20 carbon atoms, normal and branched chain perhaloalkyl substituted perhalomethylene containing from about 2 to about 20 carbon atoms, normal and branched chain perhaloalkyl substituted perhalopolymethylenes containing from about 3 to about 20 carbon atoms, perhalopolymethylene ethers containing from about 3 to about 20 skeletal atoms, and normal and branched chain perhaloalkyl substituted perhalopolymethylene ethers containing from about 4 to about 20 skeletal atoms; and wherein X is an electron withdrawing group other than a halogen or a group readily susceptible to nucleophilic attack. Suitable electron withdrawing groups include for example nitro, nitrile, sulfone, carboxylate, perhaloalkyl, ester groups, and the like. Preferred electron withdrawing groups are —CN and —COOCH$_3$. Suitable esters include COOZ wherein Z is a normal or branched chain alkyl or perhaloalkyl group of from about 1 to about 20 carbon atoms. Sulfone groups suitable for this purpose include, for example, —SO$_2$Y wherein Y is an inert organic radical containing from about 1 to about 20 skeletal atoms. Exemplary carboxylate groups include, —COOM wherein M is an alkali or alkali earth metal. Electron withdrawing perhaloalkyl groups include normal and branched chain perhaloalkyl groups containing from about 1 to about 20 carbon atoms.

In accordance with the present invention, the novel compounds of Type I are prepared by reacting

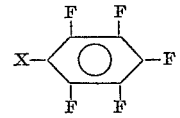

wherein X is as defined above, with $CF_2=CFOR'$, wherein R' is as defined above, in the presence of an alkali metal fluoride, preferably cesium fluoride, in a substantially anhydrous, inert, aprotic organic polar solvent.

The novel compounds of Type II of the preferred embodiment are prepared by reacting.

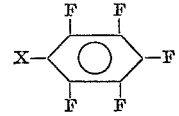

wherein X is as defined above, with a vinyl ether of the formula $CF=CFOR''OCF=CH_2$, wherein R'' is as defined above, in the presence of an alkali metal fluoride, preferably cesium fluoride, in a substantially anhydrous, inert, aprotic organic polar solvent.

The process of the present invention is carried out at a temperature from about 0° C. to about an upper temperature determined by the boiling point of the reaction mass, ordinarily from about 20° C. to about 250° C. The reaction is carried out until a significant amount of product is obtained. Optimum reaction times are dependent upon temperature and vary from about 1 hour at temperatures of about 90° C. to several days at temperatures of about 20° C.

Following the reaction, the product usually is recovered by solvent extraction techniques and subsequent liquid-liquid separatory procedures, such as fractional distillation or vapor phase chromatography.

The quantity of reactions used is not critical, however, for the purpose of convenience, about stoichiometric quantities of each reactant is employed. Any excess of a reactant will serve as a medium for the reaction.

A catalytic amount of alkali metal fluoride is sufficient, e.g., about 0.01 mole, although larger amounts cause the reaction to proceed more rapidly. The preferred molar ratio of reactants to alkali metal fluoride for the preparation of compounds of Type I is 6:6:1. The preferred molar ratio of polyfluoroaromatic reactant to divinyl ether reactant to metal fluoride for the preparation of the compounds of Type II is 6:3:1.

Solvents suitable for use in the process of the present invention are those polar aprotic liquids which are inert in the reactants and product and which will dissolve the reactants and remain liquid at the reaction temperatures. Suitable solvents are, for example, acetonitrile, diethylene glycol dimethyl ether, N,N-dimethylformamide, tetramethylene sulfone, N,N-dimethyl acetamide, and the like. The amount of solvent used is not critical, although for optimum results the reaction solution should not be excessively dilute.

The following examples will serve to further illustrate the present invention.

EXAMPLE I

Into a small round bottom flask were placed 0.5 g. (0.003 mole) of CsF, 3.0 ml. of dry acetonitrile, 3.0 g. (0.016 mole) of perfluorobenzonitrile, and 5.0 g. (0.016 mole) of perfluorobutyl perfluorovinyl ether. This mixture was stirred magnetically at room temperature for 67 hours. At the end of this period, an 82 mole percent yield (based on amount of unrecovered perfluorobenzonitrile) was obtained. This was a 63 mole percent conversion to desired product. Pure product was isolated by preparative scale vapor phase chromatography. Based on analytical data the product was believed to be characterized by the following formula:

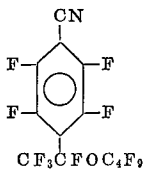

The infrared spectrum showed characteristic absorption at wave lengths of 6.8, 7.2, 8.0–9.0 (broad), 9.5, 10.1, 10.6, 11.3, 12.2, 13.5, and 13.9 microns. The nuclear magnetic resonance and mass spectra were consistent with the assigned structure.

Elemental analysis gave C—30.8%; F—63.4%. Calculated weight percentages were C—30.6%; F—63.5%.

EXAMPLE II

Into a 3 oz. Fischer-Porter bottle containing 4.0 g. (0.018 mole) of methyl perfluorobenzoate, 0.5 g. (0.003 mole) of CsF, and 2 ml. of dry tetramethylene sulfone; 5.6 g. (0.018 mole) of perfluorobutyl perfluorovinyl ether was vacuum transferred. This mixture was heated at 135° C. with stirring for 20 hours. At the end of this time, the reaction mixture was poured into water, and this mixture was extracted with trichlorotrifluoroethane. The trichlorotrifluoroethane was evaporated by heating. A 90 mole percent yield (based on amount of unrecovered methyl perfluorobenzoate) was obtained; this was a 50 mole percent conversion to the desired product. Pure product was isolated by preparative scale vapor phase chromatography. This product was believed to be characterized by the following formula:

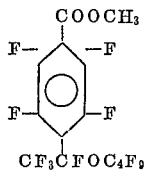

The infrared spectrum showed characteristic absorption at wave lengths of 5.8, 6.8 and 7.6–8.9 (intense) microns. The nuclear magnetic resonance spectrum was consistent with the assigned structure.

Elemental analysis gave C—31.7%; F—58.9%; H—0.55%. Calculated weight percentages were C—31.0%; F—58.9%; H—0.60%.

Compounds similar to those obtained in the preceding examples are prepared by reacting a polyfluorinated aromatic compound such as

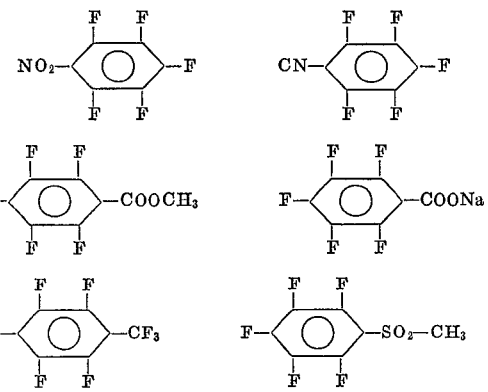

with $CF_2=CFOR'$, in substantially the manner set forth in the preceding examples, wherein R' is, for example, perfluoromethyl, perfluoroethyl, perfluoropropyl, perfluorobutyl, perfluoroisobutyl, perfluoropentyl, perfluoroheptyl, perfluorooctyl, perfluorononyl, perfluorodecyl, perfluoroundecyl, perfluorododecyl, perfluorotridecyl, perfluorotetradecyl, perfluoropentadecyl, perfluorohexadecyl, perfluoroheptadecyl, perfluorooctadecyl, perfluorononadecyl, and perfluoroeicosyl. Other useful starting materials are characterized by R' group which are monovalent derivatives of perfluoromethyl ether, perfluoroethyl ether, perfluorohexylethyl ether, perfluorotridecylpropyl ether, and perfluorononyl ether group. Also operable are vinyl ethers containing other halogens where R' is perchloromethyl, difluorochloromethyl, dichlorofluoromethyl, perchloropropyl, pentafluorodichloropropyl, perchlorodecyl, polychloropolyfluorodecyl, perchloropentadecyl, polychloropolyfluoropentadecyl, perchloroeicosyl, and polychloropolyfluoroeicosyl.

In a manner similar to the foregoing, a vinyl ether of the formula $CF_2=CFOR''OCF=CF_2$ wherein R'' is the divalent form of R' can be used, in place of the monovinyl ether, to prepare diadducts of the type hereinbefore described.

We claim:
1. Compounds having the formula:

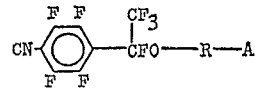

wherein A is fluorine or

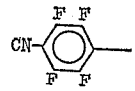

and wherein R is a perfluoro alkyl group containing from 1 to 20 carbon atoms.

2. The compounds of claim 1 wherein A is fluorine and R is $C_4F_8$.

References Cited
UNITED STATES PATENTS 3,293,305   12/1966   Haszeldine et al. _____ 260—465

CHARLES B. PARKER, Primary Examiner

C. F. WARREN, Assistant Examiner

U.S. Cl. X.R.

252—65, 403; 260—473 R, 521 A, 607 A, 611 A, 649 F, 651 F